United States Patent [19]

Nakamura et al.

[11] Patent Number: 4,956,997

[45] Date of Patent: Sep. 18, 1990

[54] VESSEL SPEED DETECTING DEVICE

[75] Inventors: Kazuhiro Nakamura; Tatsuya Yoshioka, both of Hamamatsu; Ryoji Sawada; Tomoji Nakamura, both of Iwata, all of Japan

[73] Assignee: Sanshin Kogyo Kabushiki Kaisha, Hamamatsu, Japan

[21] Appl. No.: 257,707

[22] Filed: Oct. 14, 1988

[30] Foreign Application Priority Data

Oct. 16, 1987 [JP] Japan ................................ 62-259564

[51] Int. Cl.⁵ .............................................. G01C 21/10
[52] U.S. Cl. ...................................... 73/182; 364/443
[58] Field of Search ................. 73/181, 182, 183, 184, 73/185, 186, 187; 364/571.04, 424.01, 443; 340/984, 441

[56] References Cited

U.S. PATENT DOCUMENTS 3,824,577 7/1974 Stickney ................................. 73/181
4,669,046 5/1987 Kubo ..................................... 364/565

Primary Examiner—Donald O. Woodiel
Attorney, Agent, or Firm—Ernest A. Beutler

[57] ABSTRACT

A vessel speed detecting device that incorporates an arrangement for providing a more accurate speed indication from a pressure transducer under the condition of abrupt vessel speed changes. The output signal from the pressure transducer is modified under these conditions to provide the more accurate speed indication signal. The abrupt vessel speed change is determined by comparing the output of the speed indicator with a previously memorized speed indication signal. The modified speed indication is obtained from a memory.

4 Claims, 3 Drawing Sheets

VESSEL SPEED DETECTING DEVICE

BACKGROUND OF THE INVENTION

This invention relates to a vessel speed detecting device and more particularly to an improved, simplified arrangement for providing an accurate indication of the speed of travel of a watercraft.

A wide variety of devices have been proposed for giving an indication of watercraft speed. Many of these devices are quite complicated and require complex transmission systems for transmitting a speed signal from the speed indicating device to the indicator in the operator's compartment of the watercraft. Recently, it has been proposed to provide a device that senses dynamic water pressure and utilizes a semiconductor pressure sensor for providing the speed signal. Such an arrangement is shown in copending application Ser. No. 160,124, filed Feb. 25, 1988, in the name of Kazuhiro Nakahama et al, entitled "Speedometer For Marine Vessels", and assigned to the assignee of this application. Although that type of device provides a very simple and yet highly effective arrangexent for indicating watercraft speed, there are some conditions in which the actual speed of the watercraft may deviate from the indicated speed generated by the pressure signal. For example, when there is an abrupt change in watercraft speed, particularly a sudden deceleration, the pressure signal may not be accurately indicative of actual watercraft speed.

It is, therefore, a principal object of this invention to provide an improved speed sensor for a watercraft that will give good and accurate readings even under extreme transient conditions.

It is a further object of this invention to provide a vessel speed detecting device that will give an accurate vessel speed even under abrupt transient conditions.

SUMMARY OF THE INVENTION

This invention is adapted to be embodied in a speed indicator for a watercraft that comprises a pressure transducer for experiencing dynamic water pressure created by the movement of the watercraft in a body of water. Processing means generate a speed indication signal from the output of the pressure transducer and means are incorporated for providing a modified speed indication in the event of an abrupt change in the watercraft speed.

DETAILED DESCRIPTION OF THE PREFERRED EMBODIMENT

Figure 1:
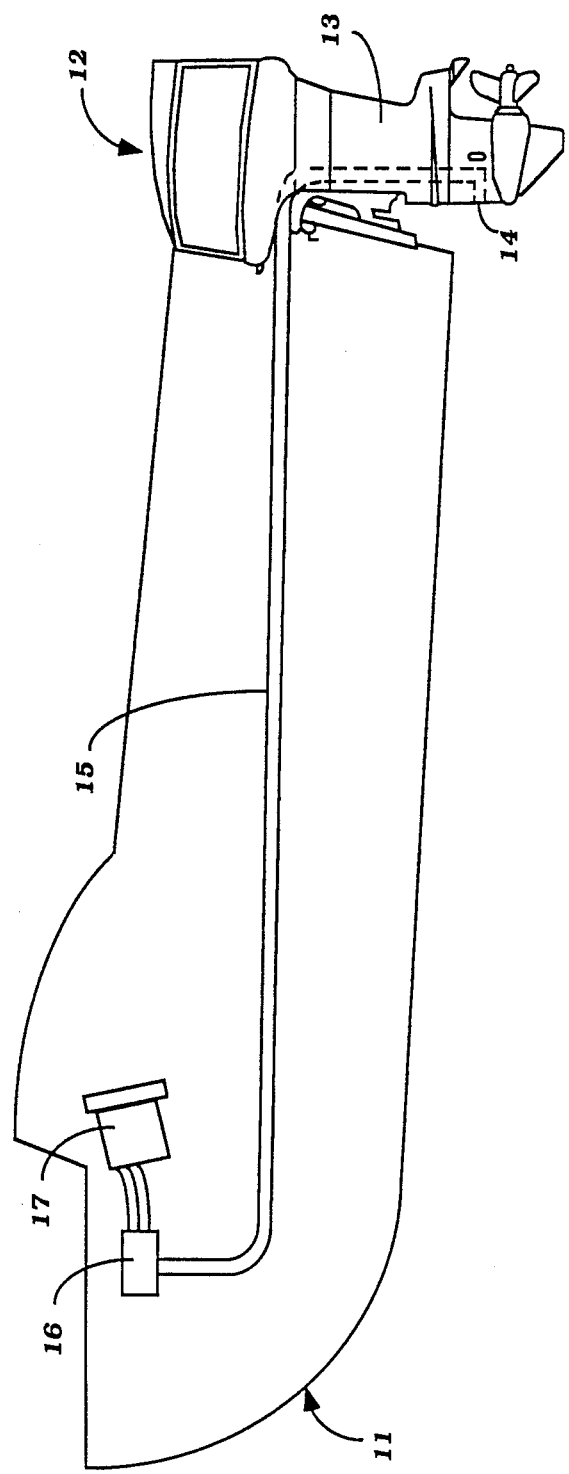
FIG. 1 is a side elevational view of a watercraft constructed in accordance with an embodiment of the invention.

Referring first to FIG. 1, a watercraft incorporating a vessel speed detecting device constructed in accordance with an embodiment of the invention is identified generally by the reference numeral 11. Basically, the construction as illustrated and described is similar to that shown in aforenoted U.S. application Ser. No. 160,124 and reference may be had to that application of the general construction of this system.

An outboard motor 12 is attached to the transom of the watercraft 11 in a known manner and includes a drive shaft housing and lower unit 13 which is formed with a forwardly facing dynamic pressure sensing opening 14. A conduit 15 extends through the outboard motor 12 from the opening 14 and mates with a conduit in the watercraft 11 for transmitting a pressure signal to a semiconductor pressure sensor 16. The pressure sensor 16 outputs a signal to a combined speed calculating and speed indicating device 17 that is positioned in proximity to the operator's location within the watercraft 11.

Figure 2:
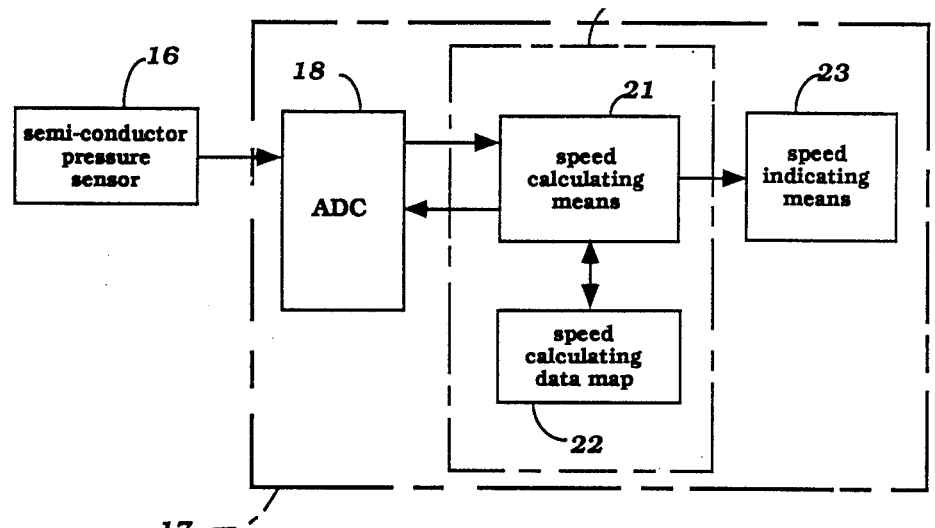
FIG. 2 is a partially schematic block diagram showing the interrelationship of the components of the system.
Figure 3:
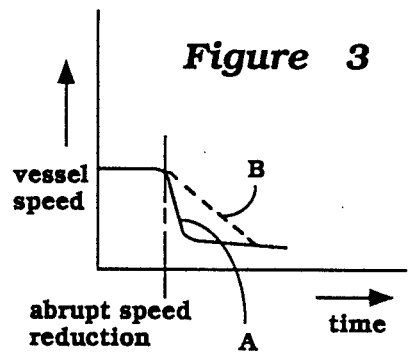
FIG. 3 is a graphical analysis showing the effect of speed indication upon a sudden deceleration.

Referring now to FIG. 2, the components of the system are disclosed in block form and include the pressure sensor 16 which outputs its signal to an analog to digital converter 18 of the speed calculator and indicator 17. The analog to digital converter 18 outputs its signal to a central processing unit (CPU) 19 such as a microcomputer which has contained within it a speed calculating device 21 which cooperates with the ADC and with a speed calculating data map 22 that is contained within a memory of the CPU 19. The speed calculating means 21 then outputs a signal to an indicating device 23 which may be of either the digital or analog type.

Basically, the semiconductor pressure sensor 16 and associated system provides an accurate speed indication under most normal running conditions. However, when the watercraft actual speed is abruptly changed such as an abrupt speed reduction as shown in the graph of FIG. 5, where the vessel speed is shown in solid line, a conventional prior art type of system will provide an incorrect, false vessel speed indication indicated by the broken line curve B during the deceleration time A and for a period of time thereafter. This is because the pressure at the sensor opening 14 does not fall as rapidly as watercraft speed and also because of the characteristics of the system as a whole. In accordance with the invention, therefore, the speed calculating data map 22 and speed calculating device 21 are provided with a device for altering the vehicle speed calculation in response to such abrupt changes in speed so as to provide a modified output curve indicated by the dot-dash curve C in FIG. 4 so as to more closely bring the speed indication into the actual watercraft speed indicated by the curve A than the prior art type of device indicated again by the curve B.

The way this calculation and adjustment is performed may be best understood by reference to FIG. 5 which is a flow diagram showing the method of operation of the system.

Referring now to FIG. 5, the program after starting moves to a step 31 wherein a calculation is made of watercraft speed from a fixed map by the calculating means 21 dependent solely on the pressure signal outputted by the semiconductor pressure sensor 16. The device then reads the previously computed vessel speed $S_1$ as contained within a memory at the step 32. Then at the step 33, a comparison is made between the differences of the present speed $S_0$ and the previous speed $S_1$ to determine if the difference is greater than a predetermined constant K. The illustrated example is for a deceleration but it is to be understood that a similar calculation may be made for an acceleration. However, the problem is more acute on deceleration than on acceleration.

Figure 4:
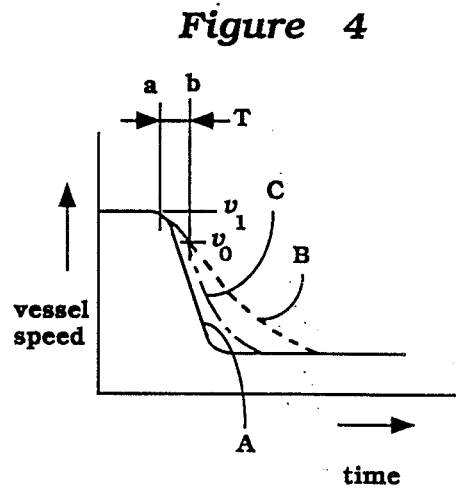
FIG. 4 is a graphical view, in part similar to FIG. 3, showing how the construction in accordance with the embodiment of the invention improves the accuracy of the speed indication under these conditions.
Figure 5:
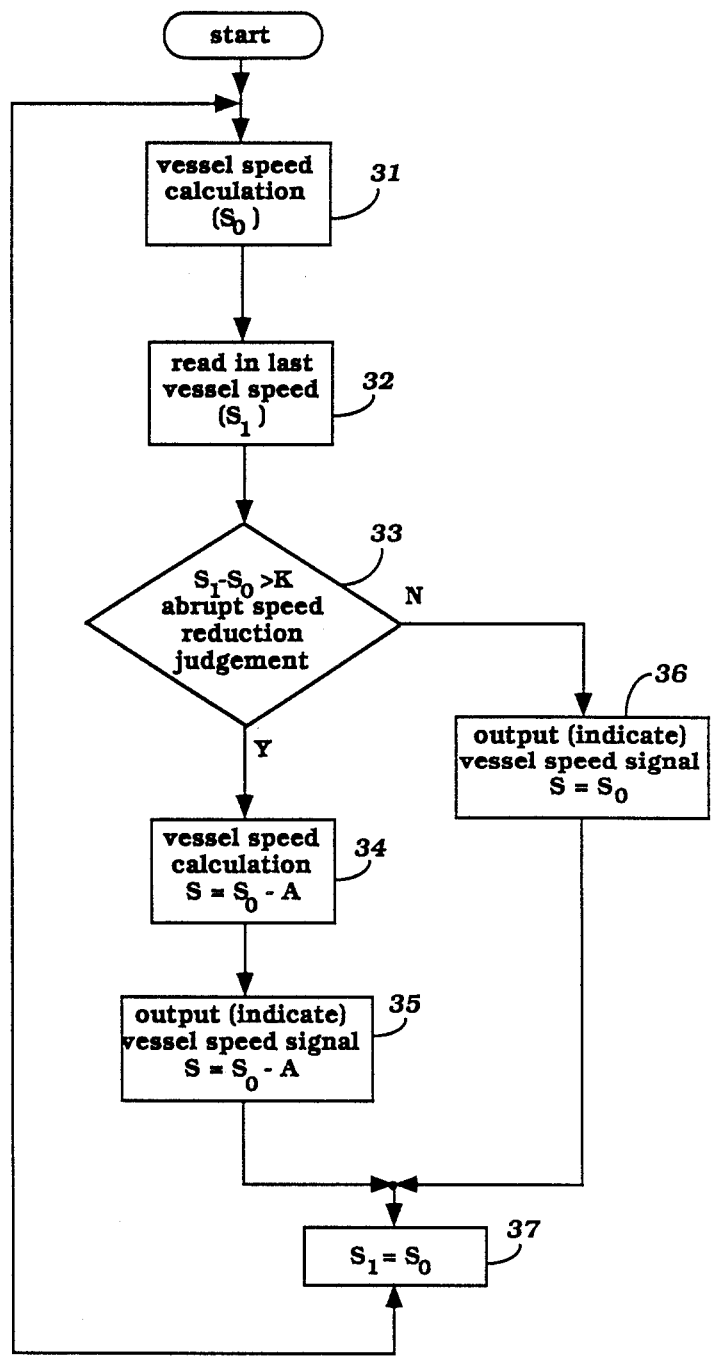
FIG. 5 is a flow diagram showing the logic of operation and steps of this embodiment.

As may be seen from FIG. 4, the calculations are made at the time T and points A and B on the graph. If actual vessel speed $V_0$ indicates the abrupt reduction, the program moves to the step 34 so as to provide a vessel speed calculation adjustment. At this step, the speed calculating means 21 containing information transmitted to it by the speed calculating data map 22 makes an adjustment in actual speed indication by substracting a constant A from the previously calculated speed $S_0$ to provide a speed signal S for indication.

This adjusted speed is then displayed at the step 35 so that the indicated speed S will be $S_0$ minus A.

If at the step 33 it is determined that there has not been an abrupt speed change, the program moves to the step 36 so as to provide the speed indication S equal to the computed vessel speed $S_0$.

Regardless of which indication is made at the step 35 or 36, the program then moves to a step 37 where the instantaneously calculated vessel speed $S_0$ from the step 31 is inserted into the memory in place of the previously memorized speed $S_1$ so that $S_0$ will now become $S_1$. This routine then continues and provides the more accurate speed indication as clearly revealed in FIG. 4.

It should be readily apparent from the foregoing description that the disclosed system is extremely effective in providing a more accurate indication of vessel speed under abrupt transient conditions, such as abrupt deceleration. Although an embodiment of the invention has been illustrated and described, various changs and modifications may be made without departing from the spirit and scope of the invention, as defined by the appended claims.

We claim:

1. A speed indicator for a watercraft comprising a pressure transducer for experience dynamic water pressure created by the movement of said watercraft in a body of water, processing means for generating a speed indication signal from the output of said pressure transducer, display means for indicating watercraft speed in response to said speed indicator signal, and means for providing a modified speed indication in the event of an abrupt change in watercraft speed.

2. A speed indicator as set forth in claim 1 wherein the abrupt change in watercraft speed is determined by comparing instantaneous output of the pressure transducer with the output signal of the pressure transducer at a previous time interval.

3. A speed indicator as set forth in claim 1 wherein the modified speed indication is obtained from a memory to provide the modified signal.

4. A speed indicator as set forth in claim 3 wherein the abrupt change in watercraft speed is determined by comparing instantaneous output of the pressure transducer with the output signal of the pressure transducer at a previous time interval.

* * * * *